US012749823B2

(12) United States Patent
Franson et al.

(10) Patent No.: US 12,749,823 B2
(45) Date of Patent: Sep. 29, 2026

(54) METHOD OF FORMING ANTENNA WITH UNDERFILL

(71) Applicant: VIASAT, INC., Carlsbad, CA (US)

(72) Inventors: Steven J. Franson, Scottsdale, AZ (US); James B. Zaccardi, Chandler, AZ (US)

(73) Assignee: VIASAT, INC., Carlsbad, CA (US)

( * ) Notice: Subject to any disclaimer, the term of this patent is extended or adjusted under 35 U.S.C. 154(b) by 49 days.

(21) Appl. No.: 18/855,831

(22) PCT Filed: Apr. 14, 2022

(86) PCT No.: PCT/US2022/024873
§ 371 (c)(1),
(2) Date: Oct. 10, 2024

(87) PCT Pub. No.: WO2023/200446
PCT Pub. Date: Oct. 19, 2023

(65) Prior Publication Data

US 2025/0253542 A1 Aug. 7, 2025

(51) Int. Cl.
*H01Q 21/00* (2006.01)
*H01Q 21/06* (2006.01)

(52) U.S. Cl.
CPC ....... *H01Q 21/0087* (2013.01); *H01Q 21/065* (2013.01)

(58) Field of Classification Search
CPC ............. H01Q 21/0087; H01Q 21/065; H01Q 1/2283; H10W 74/012; H10W 74/15
See application file for complete search history.

(56) References Cited

U.S. PATENT DOCUMENTS 5,710,071 A * 1/1998 Beddingfield .......... H01L 24/31 438/126
6,066,509 A * 5/2000 Akram .................. H01L 21/563 438/117
(Continued)

FOREIGN PATENT DOCUMENTS

EP 3465751 B1 4/2019
WO 2017209761 A1 12/2017
(Continued)

OTHER PUBLICATIONS

International Search Report and Written Opinion dated Nov. 10, 2022 in related PCT/US2022/024873 (13 pages).

*Primary Examiner* — Daniel D Chang
(74) *Attorney, Agent, or Firm* — F. CHAU & ASSOCIATES, LLC

(57) ABSTRACT

A method of forming an antenna involves forming an antenna element on an upper surface of an antenna substrate; and forming an opening that extends from the upper surface to a lower surface of the antenna substrate. An RFIC component is attached to the lower surface of the antenna substrate through a plurality of interconnects, the RFIC component thereby being spaced from the lower surface of the antenna substrate. The RFIC component includes beam-forming circuitry for RF coupling to the antenna element through the antenna substrate. Underfill is inserted into the opening from the upper surface such that the underfill flows within a space between the interconnects.

12 Claims, 11 Drawing Sheets

(56) References Cited

U.S. PATENT DOCUMENTS

| | | | | |
|---|---|---|---|---|
| 2003/0113952 | A1 * | 6/2003 | Sambasivam | H01L 21/563 438/126 |
| 2006/0099736 | A1 * | 5/2006 | Nagar | H01L 21/563 257/E21.503 |
| 2007/0176285 | A1 | 8/2007 | Jeon et al. | |
| 2019/0139915 | A1 | 5/2019 | Dalmia et al. | |
| 2023/0223707 | A1 * | 7/2023 | Franson | H01Q 21/0006 343/893 |

FOREIGN PATENT DOCUMENTS

| | | | | | |
|---|---|---|---|---|---|
| WO | WO-2021211186 | A1 | * | 10/2021 | H01Q 21/0006 |
| WO | WO-2023200446 | A1 | * | 10/2023 | H01Q 21/065 |

* cited by examiner

METHOD OF FORMING ANTENNA WITH UNDERFILL

CROSS REFERENCE TO RELATED APPLICATION

This application is a 371 National Stage entry of PCT application no. PCT/US2022/024873, filed on Apr. 14, 2022, of which the entire contents are incorporated by reference herein.

TECHNICAL FIELD

This disclosure relates generally to antennas and more particularly to a method of forming an antenna with underfill material between a radio frequency (RF) component and an antenna substrate.

DISCUSSION OF RELATED ART

A phased array antenna operational at microwave or millimeter frequencies may be constructed with layered sub-assemblies to provide an integrated structure with a thin, plate-like form factor. An upper sub-assembly may include an antenna substrate with antenna elements formed on an upper surface and a ground plane formed on or near a lower surface. A lower sub-assembly may include RF integrated circuit (RFIC) chips attached to the lower surface of the antenna substrate, each attached through distributed interconnects. The RFICs may include front end receiver and/or transmitter circuitry ("beamforming circuitry") including amplifiers, phase shifters, filters, etc., which are RF coupled to the antenna elements through the interconnects.

The interconnects are typically formed with copper or other metallic pillars or bumps on the RFICs, which are soldered to pads on the antenna substrate. The interconnects may provide most or all of the mechanical connection between the antenna substrate and the RFICs. To strengthen the mechanical connection and alleviate coefficient of thermal expansion (CTE) mismatch between the sub-assemblies, underfill material may be applied to fill spaces surrounding at least some of the interconnects. However, current techniques to apply the underfill may be burdensome and/or insufficient for the underfill to reach areas around at least the centrally located interconnects.

SUMMARY

In an aspect of the present disclosure, a method of forming an antenna involves forming an antenna element on an upper surface of an antenna substrate, and forming an opening that extends from the upper surface to a lower surface of the antenna substrate. An RFIC component is attached to the lower surface of the antenna substrate through a plurality of interconnects, the RFIC component thereby being spaced from the lower surface of the antenna substrate. The RFIC component includes beamforming circuitry for RF coupling to the antenna element through the antenna substrate. Underfill is inserted into the opening from the upper surface such that the underfill flows within a space between the interconnects.

In another aspect, an antenna includes an antenna substrate having upper and lower surfaces, an antenna element formed on the upper surface, and an RFIC attached to the lower surface through a plurality of interconnects, and underfill in a space between the plurality of interconnects. At least one underfill insertion opening extends from the upper surface to the lower surface of the antenna substrate.

The underfill insertion opening and/or other openings within the antenna substrate may be filled with microwave/mm wave absorbing material to suppress substrate modes. The antenna substrate may further include a vacuum pull opening, to which a vacuum pull is applied during the antenna fabrication to better control the flow of underfill within the space between the interconnects.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with an underscore/dash and second label that distinguishes among the same/similar elements (e.g., _1, _2), or directly annexing the reference label with a second label. However, if a given description uses only the first reference label, it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

In cross-sectional views, plan views and end views herein, distal features in the views may be omitted for clarity of illustration.

Herein, the term "antenna" may refer not only to one or more radiating components (one or more radiating elements and an antenna feed(s) coupled thereto) but to an integrated assembly of a radiating component(s) and other communication system circuitry coupled thereto such as RF front end circuitry, control circuitry controlling the RF front end circuitry, a combiner/divider network, and so forth.

Herein, "upper" and "lower" labels applied to a subject are used as relative terms for ease of description and understanding, and do not imply a required operational orientation of the subject.

Figure 1:
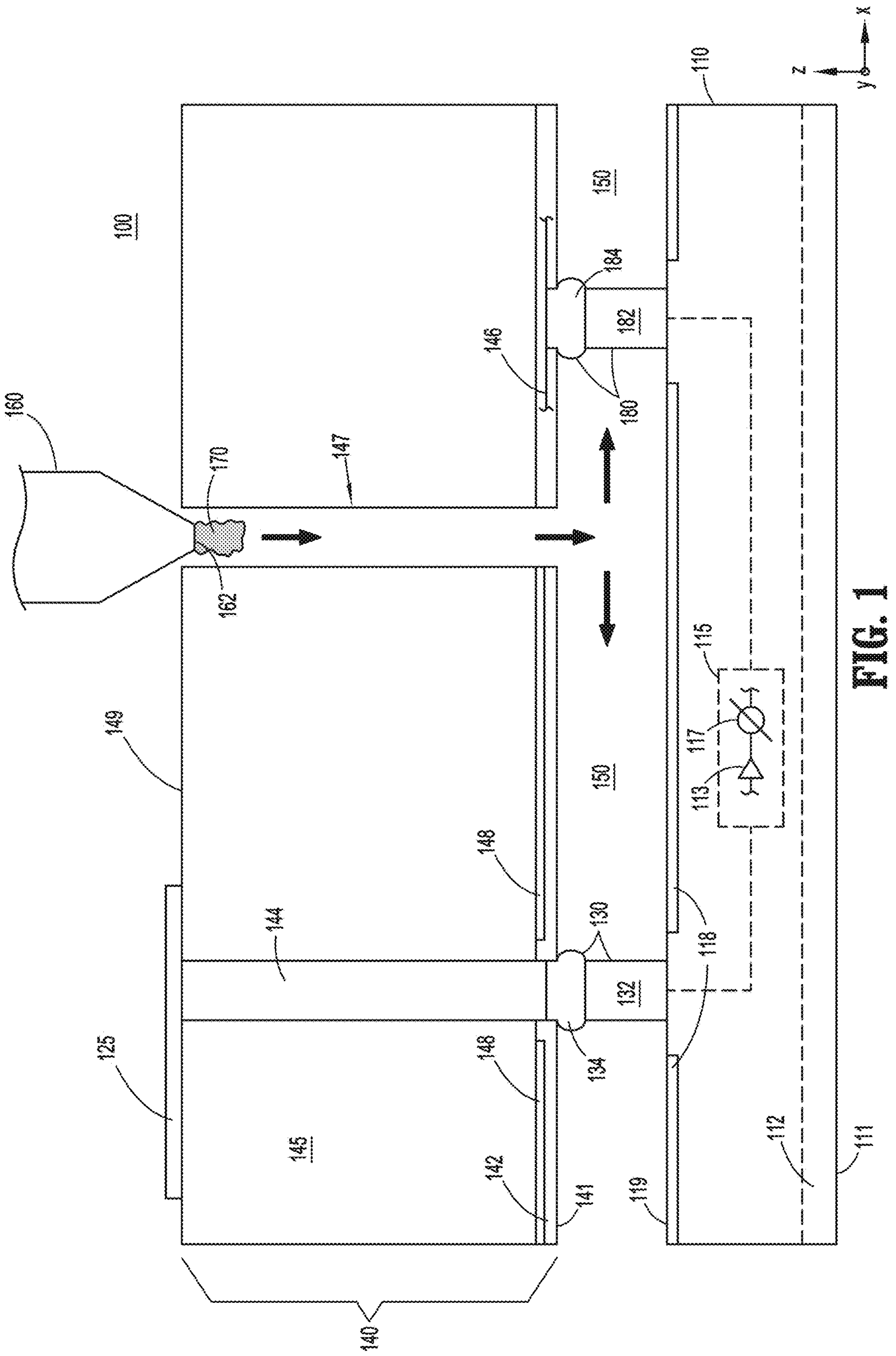
FIG. 1 is a cross-sectional view of an interim structure of an antenna, illustrating a process step of forming the same according to an embodiment.

FIG. 1 is a cross-sectional view of an interim structure of an example antenna, 100, and illustrates a process step of forming the same according to an embodiment. Antenna 100 minimally includes an antenna substrate 140, an antenna element ("radiating element") 125 and an RFIC component 110, e.g., a chip or wafer (hereafter, just "RFIC 110"). In a typical embodiment, antenna 100 is a phased array antenna including a plurality of antenna elements 125 and RFICs 110. Due to its compact integrated design, a phased array embodiment of antenna 100 may be characterized as a low size, weight and power (low "SWAP") phased array.

Antenna element 125 may be a microstrip patch, dipole, or other type of antenna element formed on or attached to an upper surface 149 of antenna substrate 140. RFIC 110 may be a monolithic microwave/millimeter wave integrated circuit (MMIC) composed of indium phosphate (InP), gallium arsenide (GaAs), gallium nitrate (GaN) or other III-V semiconductor material. RFIC 110 may be attached to a lower surface 141 of antenna substrate 140 through a plurality of interconnects such as an "antenna feed interconnect" 130 and a further interconnect 180. RFIC 110 may include beamforming circuitry 115, e.g., at least one amplifier 113 and/or at least one phase shifter 117, which are RF coupled to antenna element 125 through interconnect 130 and antenna substrate 140. Since amplifier 113/phase shifter 117 may be dynamically controlled, antenna 100 may be referred to as an "active antenna" or "active antenna array", and beamforming circuitry 115 may be interchangeably called an "active circuit unit" (AU) 115.

Interconnect 130 may include a metal contact 132, e.g., a pillar, a bump or a pad, formed on an upper surface 119 of RFIC 110, and a conductive adherent 134, typically solder, attaching metal contact 132 to antenna substrate 140. Interconnect 130 may couple beamforming circuitry 115 to a lower end of a via 144 formed within antenna substrate 140, where via 144 functions as an antenna feed. An upper end of via 144 may connect directly to antenna element 135 to form a probe feed. In other embodiments, via 144 is a blind via that only partially penetrates antenna substrate 140 and parasitically excites antenna element 125. Interconnect 180 may have a similar construction as interconnect 130, with a metal contact 182 on upper surface 119 of RFIC 110 and a conductive adherent 184 attaching metal contact 182 to antenna substrate 140.

Antenna substrate 140 may include a relatively thick upper dielectric portion 145 and a lower portion composed of a relatively thin layered region 142 including at least one conductive layer and at least one dielectric layer. Any suitable dielectric, such as fused silica, may be used for the dielectric material within antenna substrate 140. Layered region 142 may include an antenna ground plane 148 and one or more other conductive layers 146, e.g., patterned layers to provide control/bias signals to beamforming circuitry 115. Interconnect 180 may couple beamforming circuitry 115 to a control/bias signal layer 146 as illustrated or to a ground layer (e.g., 148) within layered region 142. Further interconnects 180 (not shown) may also be provided purely for mechanical support. Alternative structures for interconnects 130 and 180 to those illustrated may be substituted. For instance, each interconnect 130 or 180 may include a pair of copper pillars or bumps, or a pair of relatively thin metal pads on opposite sides, which are electrically connected with solder therebetween. Interconnects 130 and 180 may have any suitable structure that results in a separation of the lower surface 141 of antenna substrate 140 from the upper surface 119 of RFIC 110.

RFIC 110 is spaced from antenna substrate 140 by the heights of the interconnects 130 and 180 (in the vertical (z axis) direction in FIG. 1), such that a space 150 exists between and around interconnects 130 and 180. To strengthen the mechanical connection and alleviate CTE mismatch between RFIC 110 and antenna substrate 140, it is desirable for space 150 to be filled with underfill 170. Underfill 170 may be a dielectric material that acts as a glue; examples include epoxy materials with a silicon filler designed to minimize CTE mismatch.

An improved method for inserting the underfill 170 into space 150 is a "vertical insertion" method that involves forming an opening ("underfill insertion opening") 147 within antenna substrate 140 extending vertically therethrough. An applicator tool 160 with a tip 162 may be used to insert underfill 170 in a liquid form within opening 147. The underfill 170 flows down opening 147 and spreads outwardly within space 150 as depicted by the arrows to partially or completely fill space 150. With this method, the need to inject underfill peripherally (a direction parallel to the x-y plane of FIG. 1) is avoided. Further, in some configurations with a plurality of coplanar RFICs 110 arranged in the x-y plane (discussed later), underfill 170 flows to central regions of antenna 100 that may be unreachable with a peripheral injection method.

Beamforming circuitry 115, although depicted schematically, may include transistors with ion implantation regions within an "active die side" 112, which is a lower portion of RFIC 110 adjacent lower surface 111. The beamforming circuitry 115 may be configured in a coplanar waveguide (CPW) and/or a microstrip transmission line medium. The opposite side of RFIC 110 may include a ground surface 118 that may connect to the CPW ground surfaces and/or may act as a microstrip ground plane for beamforming circuitry 115 and/or as a DC bias ground/control signal ground. When the active die side 112 faces away from the antenna ground plane 148 within layer region 142 as in FIG. 1, the likelihood of oscillations may be reduced as compared to an embodiment with RFIC 110 flipped around.

The type and configuration of antenna elements 125, their spacing from antenna ground plane 148, and feed design for a desired polarization may depend upon the application and a desired frequency band of operation. Similar design considerations are applicable to the beamforming circuitry 115 of RFIC 110. Typically, antenna 100 is configured for operation in a microwave or millimeter (mm) wave band, where microwave frequencies may be considered 300 MHz to 30 GHz and mm wave frequencies may be considered 30 GHz to 300 GHz.

Figure 2:
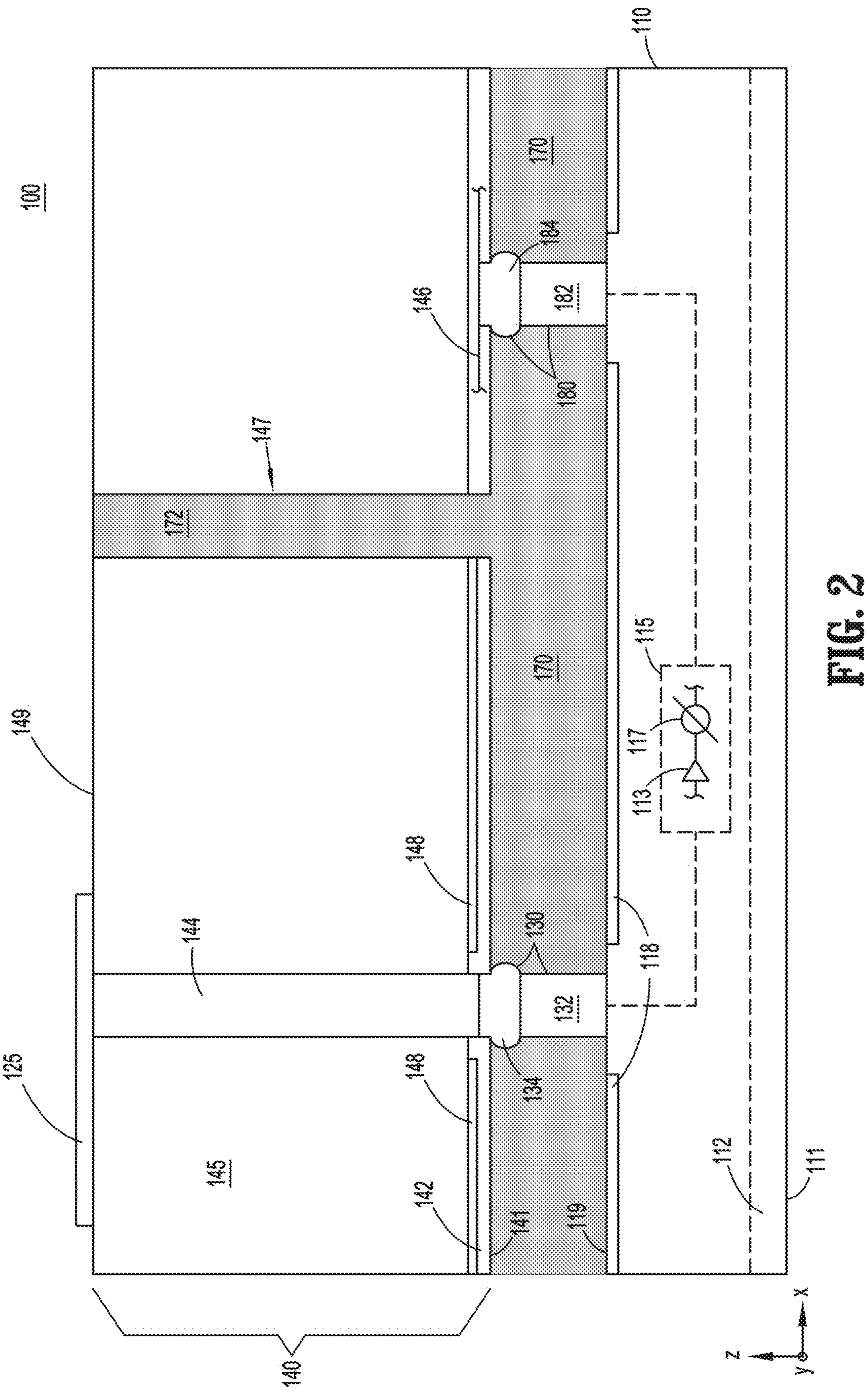
FIG. 2 is a cross-sectional view depicting the antenna of FIG. 1 in a final configuration according to an embodiment.

FIG. 2 is a cross sectional view of antenna 100 in a final configuration according to an example. Underfill 170 nearly filles or completely fills space 150 between and surrounding interconnects 130 and 180. Material 172 fills underfill insertion opening 147. Material 172 is the same material, or a second, different material as underfill 170. In one example, the second material 172 is the same material as the antenna substrate dielectric 145. In another example, the second material is microwave/millimeter wave absorber material, which may help prevent "substrate modes" in which signal energy flows out horizontally through the edges of the antenna substrate 140.

A typical embodiment of antenna 100 may utilize about ten to thirty interconnects per RFIC. For instance, an RFIC 110 may be RF coupled to several antenna elements 125, and each RF coupling configuration may include three interconnects if a ground-signal-ground (GSG) connection is made: one interconnect 130 for a "signal" connection (corresponding to an inner conductor of a transmission line), and two "ground" interconnects on opposite sides of the signal interconnect 130, where the ground interconnects are attached to antenna ground plane 148. In other embodiments a single ground interconnect is provided adjacent the interconnect 130 to form a "ground-signal" (GS) connection. In still other embodiments, three or more ground interconnects are provided surrounding each interconnect 130. In addition, multiple interconnects 180 may be arranged, where some are connected to conductive traces providing amplifier bias voltages in layer region 142, other ones connect to conductive traces in layer region 142 providing phase shifter control signals, and so forth.

Although not shown in FIG. 2, a polyimide protective layer such as a polyimide tape (e.g., Kapton® tape) may be placed over antenna element(s) 125 and antenna substrate upper surface 149. When antenna 100 is deployed for operation in a vacuum, e.g., on a spacecraft, there may be floating metal formed on the surface, which could adversely affect antenna performance. To prevent this problem, a small amount of germanium or equivalent metal may be added to the polyimide layer, and the polyimide layer with germanium may be grounded to bleed off charges. Examples presented later in connection with FIGS. 9 and 10 describe techniques to improve the reliability of the polyimide layer.

Figure 3:
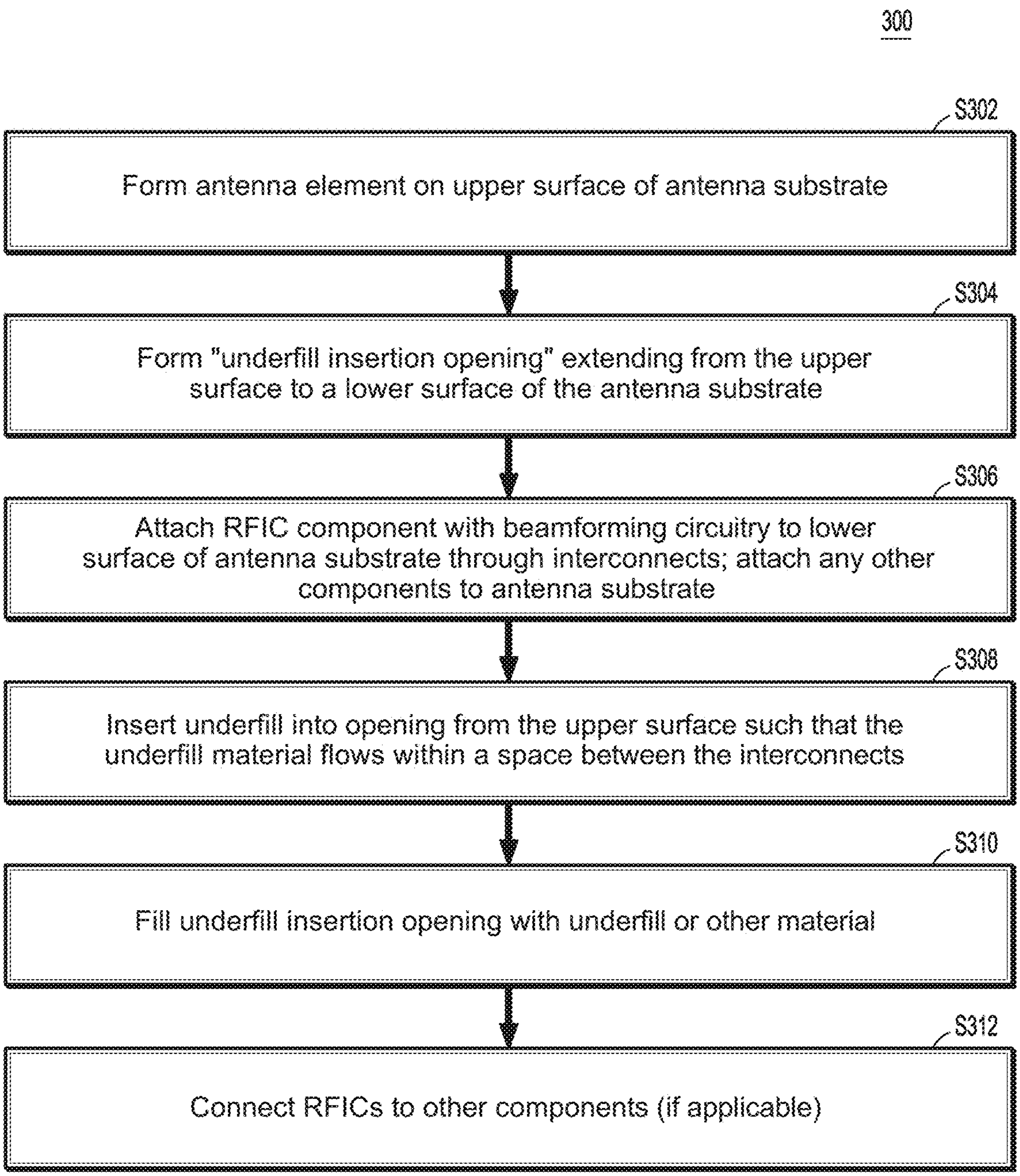
FIG. 3 is a flow chart outlining a method of forming the antenna of FIG. 2 according to an embodiment.

FIG. 3 is a flow chart outlining a method, 300, of fabricating the antenna of FIG. 2 according to an embodiment. The order of the illustrated method 300 stages is non-critical and may be varied as desired. At stage S302, an antenna element(s) is formed on the upper surface of antenna substrate 140, e.g., by printing a microstrip patch element. At stage S304, one or more underfill insertion openings 147 extending from the upper surface 149 to the lower surface 141 of the antenna substrate is formed, e.g., by laser drilling from either surface. In an example, the opening 147 is formed above a central location of an RFIC 110 to be attached to antenna substrate 140. In embodiments where antenna 100 includes a plurality of RFICs, one or more underfill insertion openings 147 may also be formed around this time, aligned with respective ones of the RFICs 110. If other circuit components (e.g., control IC chips 760, 761 and/or a combiner/divider 780 of FIG. 7) are to be attached to antenna substrate 140 using similar interconnects that are to be later supported by underfill 170, additional underfill insertion openings 147 may be formed in alignment with these components as well.

The formation of opening(s) 147 at stage S302 may be performed at about the same time that other openings for different purposes, such as an opening for via 144, are formed within antenna substrate 140. (The via 144 opening may be subsequently metallized and concurrently connected at its upper end to antenna element 125.) Such other openings may further include "substrate mode suppression" openings outside the periphery of antenna element 125 that are subsequently filled with microwave/mm wave absorber material to suppress substrate modes in which RF signal energy leaks out peripherally from antenna substrate 140.

At least one RFIC 110 with beamforming circuitry is attached to the lower surface 141 of the antenna substrate by completing the formation of interconnects such as 130, 180 (S306). Using a controlled heating and cooling process on the interim structure, multiple interconnects 130 and 180 may be simultaneously formed to adhere antenna substrate 140 to RFIC 110 (and to other components, if applicable) as the solder or equivalent conductive adherent heats and cools. For some adherents, only a sufficient curing time at ambient temperature is needed to cure the adherent, without the need for heating and cooling. If additional circuit components such as the above-noted combiner/divider and control IC chips are to be attached to lower surface 141, their attachment may be completed at around this time.

Underfill 170 may then be inserted into opening 147 from the upper surface 149 of the antenna substrate, such that the underfill 170 flows within the space 150 between and around interconnects 130 and 180 (S308). For instance, with proper control of the underfill application process, a majority volume or an entire volume of the air-filled or vacuum-filled space 150 between the upper surface 119 of RFIC 110 and the lower surface 141 of antenna substrate 140 may become filled with underfill through diffusion. In other embodiments discussed below, an additional opening (a "vacuum pull opening") is formed through antenna substrate 140 and a vacuum is applied through the additional opening to better control the underfill flow. If multiple RFICs 110 are included within antenna 100, some or all may include at least one opening 147, which may be likewise filled with underfill around this time. Similarly, in embodiments where other circuit components of antenna 100 (e.g., control IC chips 760, 761 of FIG. 7) are attached to antenna substrate 140 with interconnects, underfill may be inserted in their associated underfill insertion openings 147 around this time.

Once space 150 is filled with underfill, the underfill insertion opening 147 may be filled with a material 172, which may be the same underfill material or a second material as mentioned earlier (S310). To fill opening 147 with the same underfill 170, the underfill may be applied from the upper surface 149 of antenna substrate 140 until both space 150 and opening 147 are filled. To fill opening 147 with a different material, applicator tip 162 (FIG. 1) may be elongated such that it extends to the lower end of opening 147 to first fill space 150 with underfill 170, without filling opening 147. Thereafter, applicator tip 162 may be removed and applicator 160 or another applicator may be used to insert the different material from the upper surface 149 and thereby fill opening 147. Alternatively, opening 147 is first filled with underfill 170 and thereafter drilled out and re-filled with the different material.

The RFICs may thereafter be electrically connected to other components of antenna 100 or to external components (S312), in applicable embodiments. For instance, connections between RFICs 110 and a combiner/divider may be made with wirebonds connecting metallization on the active die side 112 to metallization of the combiner/divider, as described later in connection with FIGS. 7-8B. The wirebonded connections of stage 312 may be made after the underfill 170 insertion process is completed.

Figure 4:
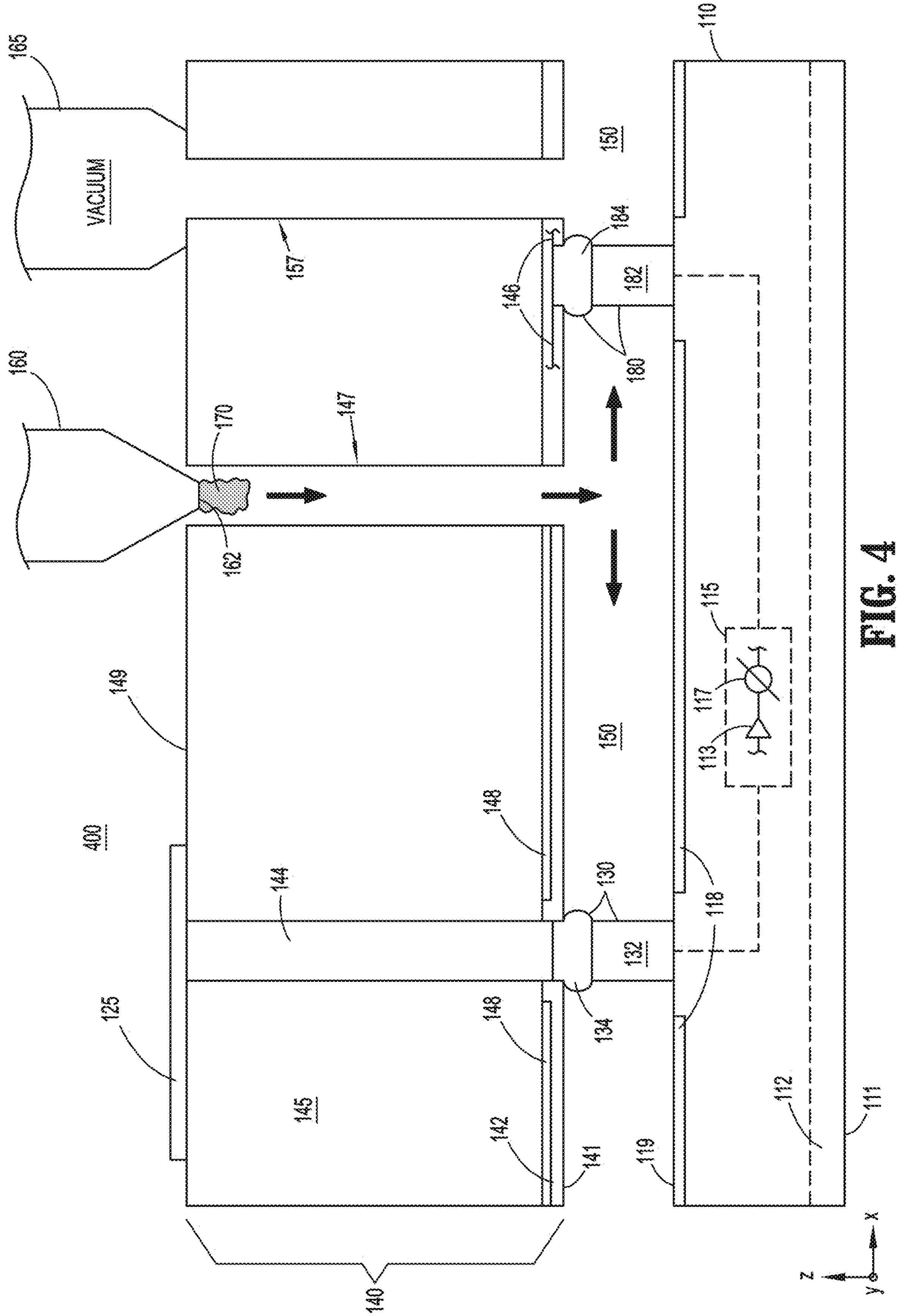
FIG. 4 is a cross-sectional view of an interim structure of an antenna, illustrating a process of forming the same according to another embodiment.
Figure 5:
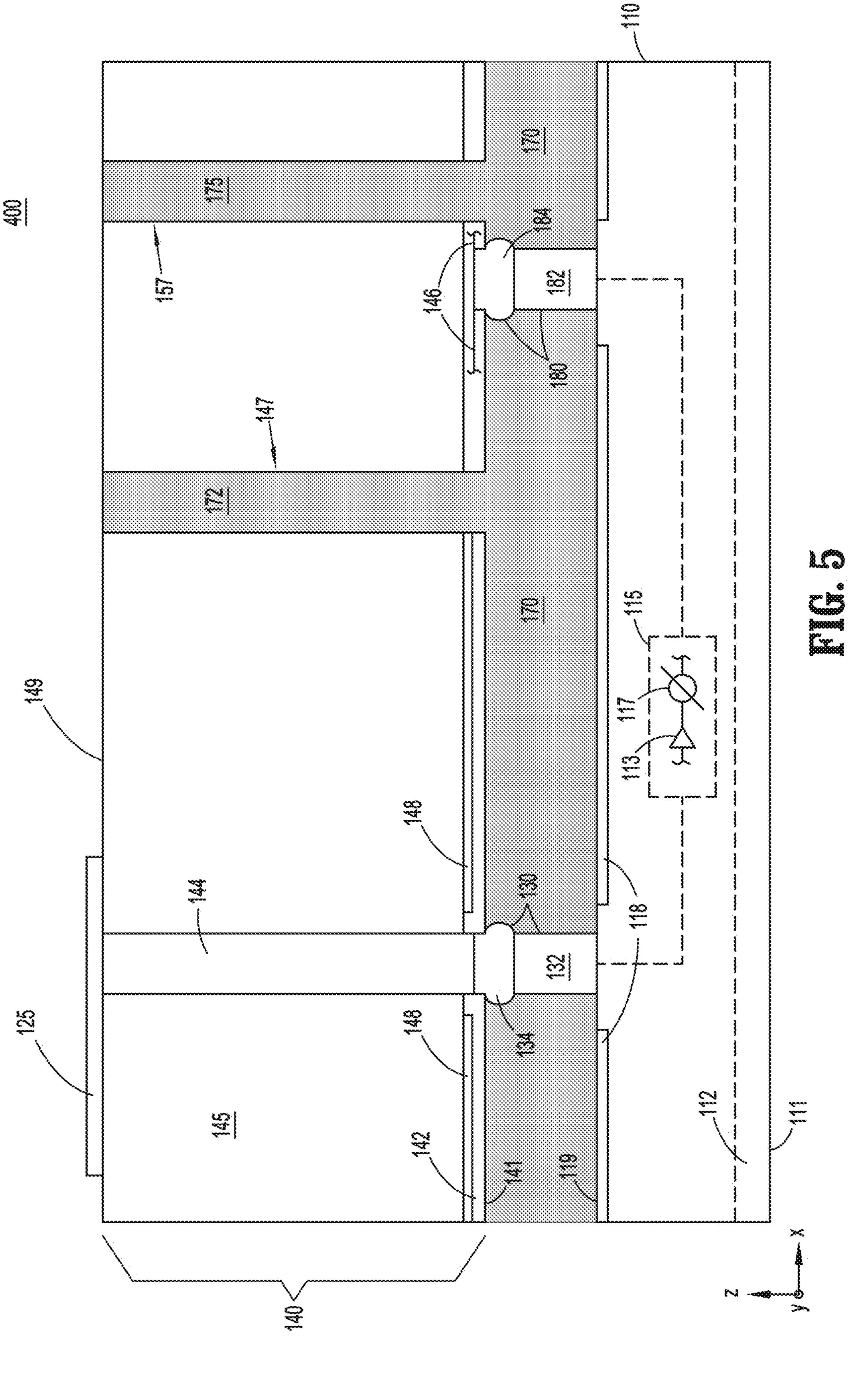
FIG. 5 is a cross-sectional view of the antenna of FIG. 4 in a final configuration according to an embodiment.

FIG. 4 is a cross-sectional view of an interim structure of an antenna, 400, illustrating a process of forming the same according to another embodiment. FIG. 5 illustrates antenna 400 in a final configuration according to an embodiment. As shown in FIGS. 4 and 5, antenna 400 differs from antenna 100 described above by including at least one "vacuum pull opening" 157 extending completely through antenna substrate 140. In an interim process step for forming antenna 400, a vacuum application tool 165 applies a vacuum pull to opening 157 during the insertion of underfill 170 within underfill insertion opening 147. The vacuum pull may speed up and better control the flow of underfill 170 in its liquid/semi-liquid form within opening 147 and space 150. In a typical embodiment, when underfill insertion opening 147 is located directly above a central region of RFIC 110, opening 157 is located above a peripheral portion of RFIC 110. A plurality of openings 157 may be arranged above different peripheral locations of RFIC 110, and a vacuum may be simultaneously or sequentially applied to the various openings 157 to control the flow and reach of the inserted underfill 170 into desired regions of space 150. Opening 157 may be filled with material 175, which may be the same as or different from material 172 within opening 147.

Figure 6:
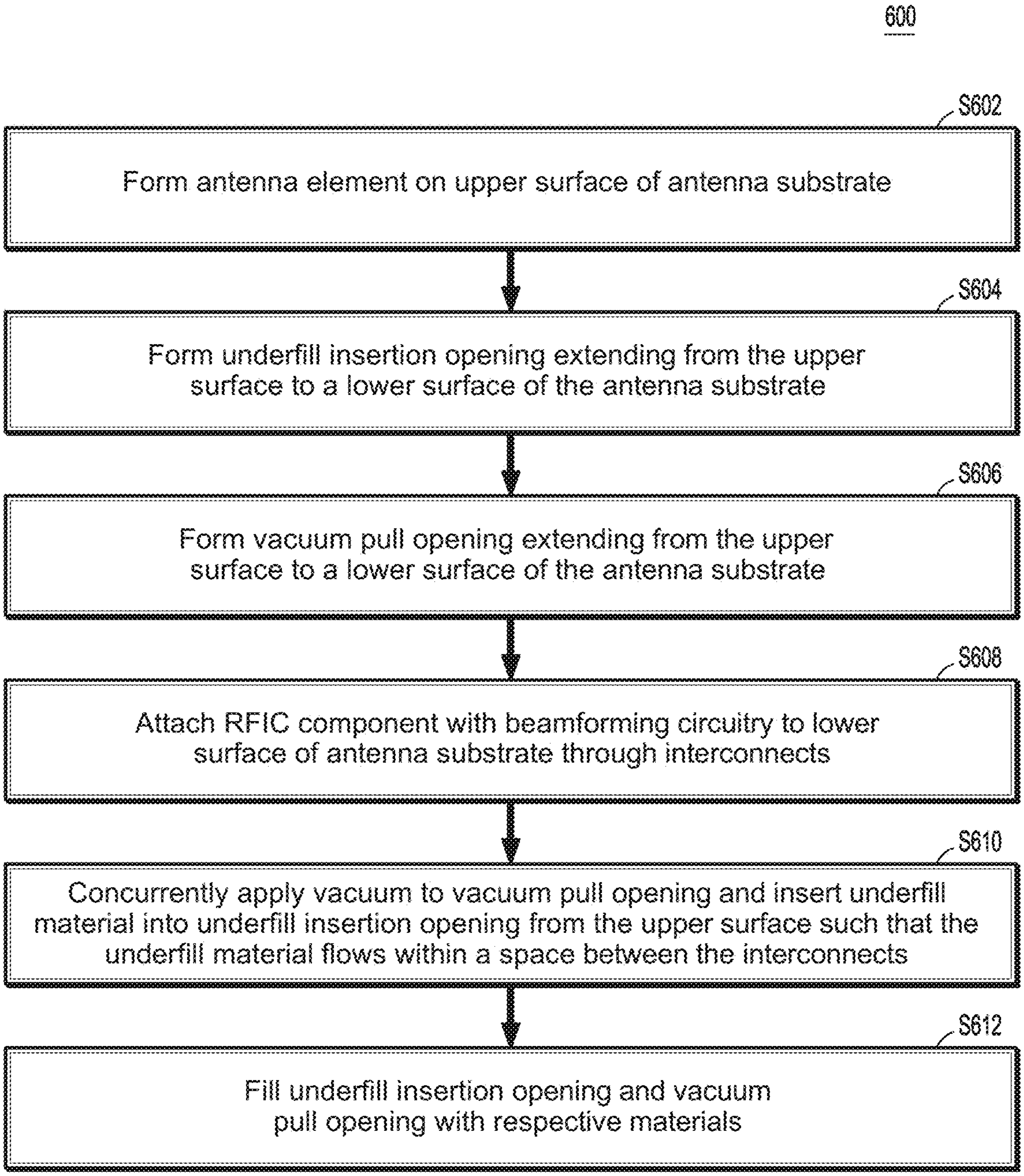
FIG. 6 is a flow chart outlining a method of forming the antenna of FIG. 5 according to an embodiment.

FIG. 6 is a flow chart outlining an example method of fabricating the antenna of FIG. 5. The order of the illustrated method 600 stages is non-critical and may be varied as desired. Referring to FIGS. 4-6, stages S602 and S604 of forming an antenna element on the upper surface of antenna substrate 140 and forming an underfill insertion opening, may be the same as stages S302 and S304, respectively, of FIG. 3. At least one vacuum pull opening 157 extending between the upper and lower surfaces of antenna substrate 140 may be formed (S606). Opening 157 may have similar dimensions to opening 147 and may be formed using the same or a similar technique such as laser drilling. Stage S606 of attaching an RFIC 110 to the lower surface of antenna substrate 140 through interconnects 130, 180 may be the same as stage S308 discussed above.

With RFIC 110 thus attached to antenna substrate 140, at stage S610, a vacuum may be applied from the upper surface of vacuum pull opening 157 using tool 165 while underfill 170 is inserted within opening 147. The upward vacuum pull through opening 157 may act as a suction force enhancing the diffusion of underfill 170 from opening 147 into space 150 between and around the interconnects. If a plurality of openings 157 have been formed within antenna substrate 140 arranged above various locations of RFIC 110, a vacuum may be simultaneously or sequentially applied to the various openings 157 while underfill 170 is inserted within opening 147 to cause the underfill to flow outward from opening 147 in desired directions within space 150.

Once space 150 is sufficiently filled with underfill 170, underfill insertion opening 147 and vacuum pull opening 157 may be filled with materials 172 and 175, respectively, each of which may be the same underfill 170 material or a different material (S612). To fill openings 147 and 157 with the same underfill 170, the underfill may be applied from the upper surface 149 of antenna substrate 140 until both space 150 and openings 147 and 157 are filled. To fill openings 147 and 157 with a different material, a similar process discussed earlier may be performed. For instance, applicator tip 162 (FIG. 1) may be elongated such that it extends to the lower end of opening 147 to first fill space 150 with underfill 170 without filling openings 147 and 157. Thereafter, applicator tip 162 may be removed and applicator 160 or another applicator may be used to insert the different material from the upper surface 149 into each of openings 147 and 157 to thereby fill the same with materials 172 and 175 (which may be the same or different). Alternatively, openings 147/157 are first filled with underfill 170 and thereafter drilled out and re-filled with the different respective materials.

Figure 7:
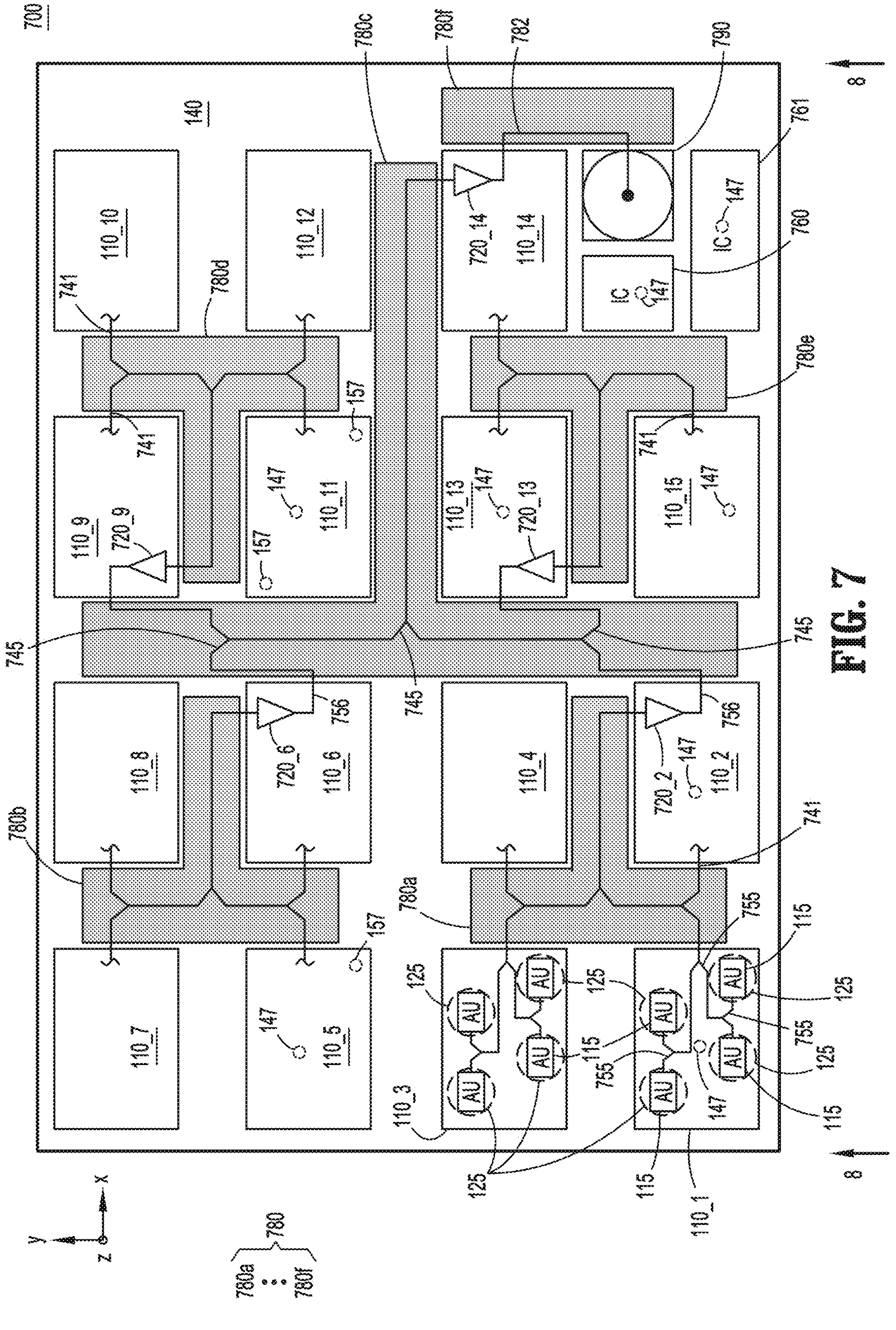
FIG. 7 is a bottom view of an active array antenna according to an embodiment.
Figure 8A:
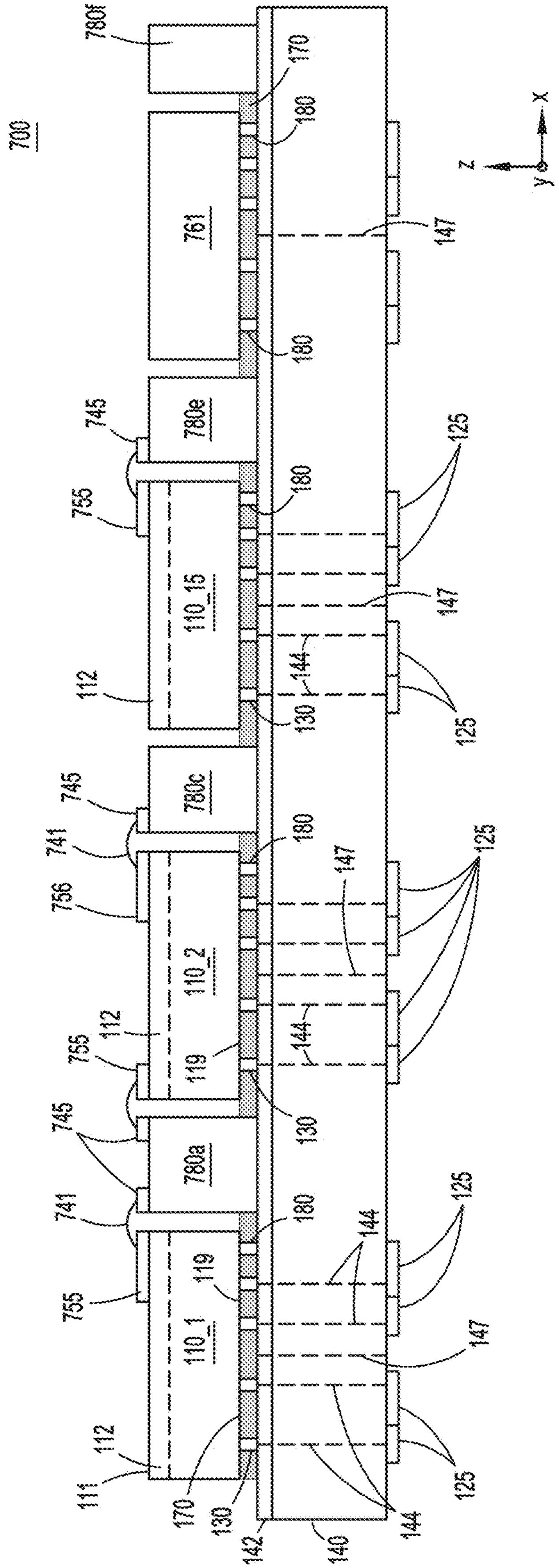
FIG. 8A is an end view of the active array antenna of FIG. 7 according to one example.
Figure 8B:
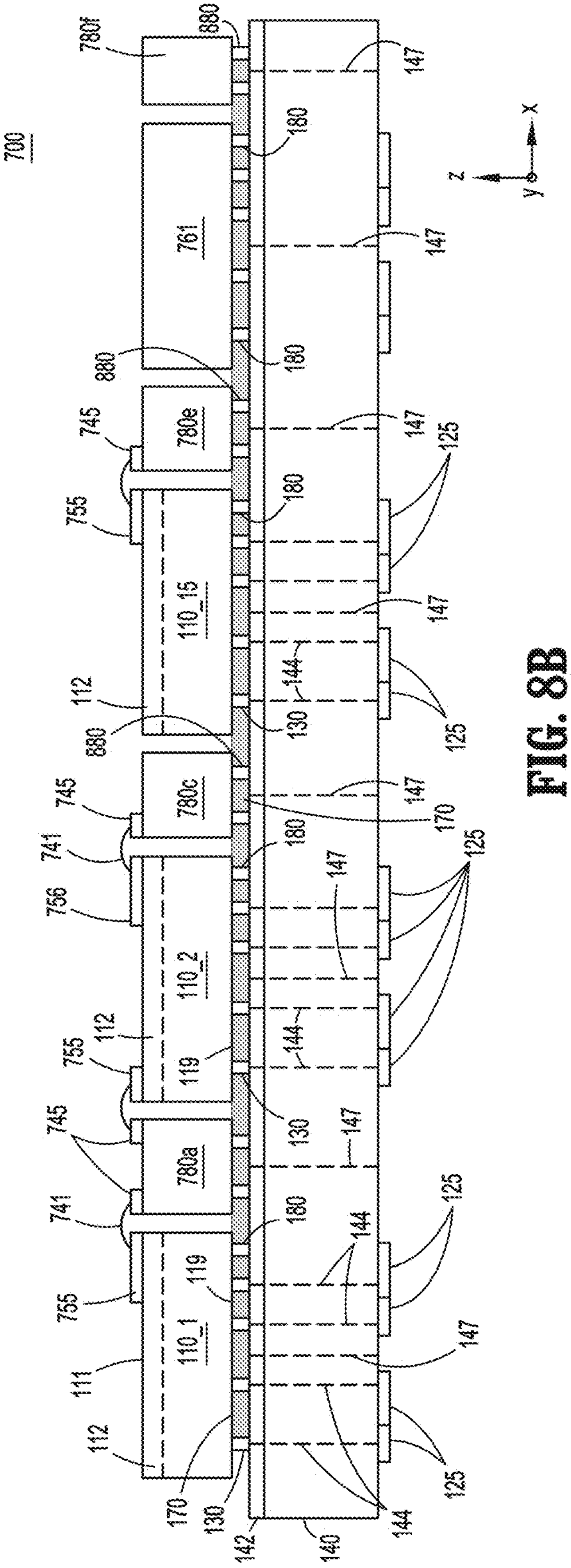
FIG. 8B is an end view of the active array antenna of FIG. 7 according to another example.

FIG. 7 is a bottom view of an active array antenna 700 according to an embodiment, and is an example of antenna 100 or 400 described above (depending on optional features discussed below). FIGS. 8A and 8B are respective examples of end views of antenna 700. Active array antenna 700 includes capability for dynamically adjusting a resulting transmit/receive beam direction/beam pattern through dynamic control of active circuit units (AUs) 115 within RFICs 110. Antenna 700 is a phased array antenna in embodiments where AUs 115 include phase shifters.

Antenna 700 includes an antenna substrate 140 with RFICs 110_1 to 110_15 attached thereto, where each RFIC may be coupled to a plurality of antenna elements 125, e.g., four antenna elements as illustrated for RFICs 110_1 and 110_2. Antenna 700 further includes a combiner/divider network ("combiner/divider") 780, control IC chips 760 and 761, and an RF input/output (I/O) port 790, each attached to antenna substrate 140. Combiner/divider 780 is exemplified as a 1:15 combiner/divider with sections 780*a* to 780*f*, where sections 780*a*, 780*b*, 780*c*, 780*d* and 780*e* each include portions situated between at least two RFICs 110. Control IC chips 160 may be composed of a different type of semiconductor material than RFICs 110, e.g., silicon (Si) or silicon germanium (SiGe).

Antenna 700 may be configured as a transmitting antenna system, a receiving antenna system, or both a transmitting and receiving antenna system. Accordingly, combiner/divider 780 combines signals received from RFICs 110 into a combined receive signal that is output through section 780*f* to RF I/O port 790, and/or divides a transmit signal applied to RF I/O port 790 into divided transmit signals, each output to a respective RFIC 110. In a receive direction, each RFIC 110 adjusts and combines "element signals" received from the antenna elements 125 coupled thereto and outputs the combined signal to combiner/divider 780. In a transmit direction, each RFIC 110 may divide an input RF transmit signal provided thereto from combiner/divider 780 and adjust the divided signals into transmit path element signals respectively output to those antenna elements 125.

Each combiner/divider section 780*a*-780*f* may be composed of a dielectric substrate such as alumina, and at least one patterned metal layer forming an RF signal conductor of a transmission line. The patterned metal layer may form couplers, such as the depicted three 2:1 couplers 745 (three "3 dB couplers") within each of sections 780*a* to 780*e*. The dielectric substrate may be adhered to antenna substrate 140 using an epoxy (as in FIG. 8A) or through interconnects 880 (shown in FIG. 8B) akin to interconnects 130 or 180. Combiner/divider sections 780*a*-780*f* may be formed as coplanar waveguide (CPW), microstrip, or stripline type components. In other embodiments, combiner/divider 780 is constructed with a single dielectric substrate, rather than the individual substrates forming sections 780*a*-780*f*.

One or more of RFICs 110_1 to 110_15 includes at least one underfill insertion opening 147 used to insert underfill 170 within the space between and around interconnects 130 and 180, as described above. For instance, each of RFICs 110_11 and 110_13 is almost completely surrounded by portions of combiner/divider 780. As such, it would be difficult if not impossible to insert underfill 170 between these RFICs and antenna substrate 140 using a peripheral insertion technique (inserting the underfill from the side, i.e., in a direction parallel to the x-y plane of FIG. 7). Thus, it is desirable to provide openings 147 in each RFIC 110 for which the "vertical insertion" technique as described above is beneficial. One or more of RFICs 110_1 to 110_15 may also include at least one vacuum pull opening 157 as described above to better control the diffusion of underfill 170 when applied. (When a vacuum pull opening 157 is included, antenna 700 is an example of the above-described antenna 400.)

ICs 760 and 761 may connect to conductive traces within layer region 142 of antenna substrate 140 to provide bias/control signals to AUs 115. Such connections to the conductive traces may be made through respective interconnects 180, and it may be desirable for spaces between and around these interconnects 180 to be filled with underfill 170. Accordingly, additional underfill insertion openings 147 may be formed within antenna substrate 140 at locations aligned with a central point of each control IC 760 and 761, to fill the spaces between and around those interconnects 180.

The configuration of antenna 700 is only an example that may be modified in many ways in other embodiments. For instance, as shown in FIGS. 8A and 8B, RFICs 110_1 to 110_15 are illustrated with active die sides 112 opposite the surfaces 119 that interface with interconnects 130, 180. As mentioned above, this arrangement may reduce oscillations otherwise due to the active die sides being too close to antenna ground plane 148. In conjunction with this configuration, AUs 115 of an RFIC 110 may be coupled to combiner/divider 780 though wirebonds 741 that may each connect a coupler 755 of the RFIC 110 to a coupler 745 of combiner/divider 780. Alternatively, RFICs 110 may be flipped and the connections between couplers 745 and 755 may be made in other ways. Some of the RFICs such as RFIC 110_2 are shown to include an intermediate amplifier such as 720_2 (with an output signal line 756 coupled to a signal line of combiner/divider 780) to selectively amplify signals in the receive path and thereby improve a tradeoff between DC power consumption and noise figure performance. Other embodiments may omit the intermediate amplifiers, or include analogous transmit path intermediate amplifiers.

FIG. 8A depicts an example in which combiner/divider sections 780*a*-780*f* are each attached to antenna substrate by an epoxy. In this case, underfill 170 inserted through one or more openings 147 in at least one adjacent RFIC 110 may diffuse and abut against a side surface of a given section 780*a*-780*f*. Note that in this embodiment, if couplers 745 are formed with coplanar waveguide, a ground connection at the lower surface of any section 780*a*-780*f* is not needed. Couplers 755 may likewise be formed in CPW, in which case ground surfaces atop surface 111 of the RFICs 110 on opposite sides of signal line traces may connect to CPW ground surfaces atop sections 780*a*-780*f* with additional respective wirebonds 741. Nevertheless, if a ground connection between sections 780*a*-780*f* is desired (e.g., if couplers 755 are formed in microstrip), a conductive epoxy may connect a ground surface at the lower portion of any section 780*a*-780*f* with the ground plane within layer region 142 of antenna substrate 140. FIG. 8A also illustrates that underfill 170 may be present between and around interconnects 180 formed between IC 761 and antenna substrate 140, where the underfill 170 may have been inserted through an underfill insertion opening 147 aligned with a central region of IC 761.

FIG. 8B illustrates an example in which combiner/divider sections 780*a*-780*f* are each attached to antenna substrate by a plurality of interconnects 880, which may be similar or identical to interconnects 130 or 180. A ground surface (not shown) within sections 780*a*-780*f* may connect to an antenna ground plane 148 (see FIG. 2) within layer region 142 through interconnects 880. One or more underfill insertion openings 147 may underly any section 780*a*-780*f* as illustrated, through which underfill 170 is inserted to surround the space between interconnects 880, in the same manner as described above with respect to interconnects 130 and 180. Vacuum pull openings 157 (not shown) may also underly any section 780*a*-780*f*, to better control the underfill flow as described above in connection with FIG. 4.

In another active array embodiment, a combiner/divider with alumina or other substrate arranged coplanarly with RFICs 110 as in FIGS. 7-8B, i.e., in the same subassembly layer, is replaced with a combiner/divider formed within a substrate in a different subassembly layer. For instance, a second substrate within which a combiner/divider is formed may be sandwiched between antenna substrate 140 and RFICs 110. In such an embodiment, interconnects 130 and 180 may be formed between RFICs 110 and the second substrate, instead of making a direct connection between RFICs 110 and antenna substrate 140. Thus, interconnects 130 in this example may connect RFICs 110 to longer vias 144 that extend within both within antenna substrate 140 and the second substrate. In this case, longer underfill insertion openings 147 may be modified to extend through both the antenna substrate 140 and the second substrate, and underfill may be inserted through the longer openings 147 in the same way as described above to fill the space between and surrounding the interconnects.

Figure 9:
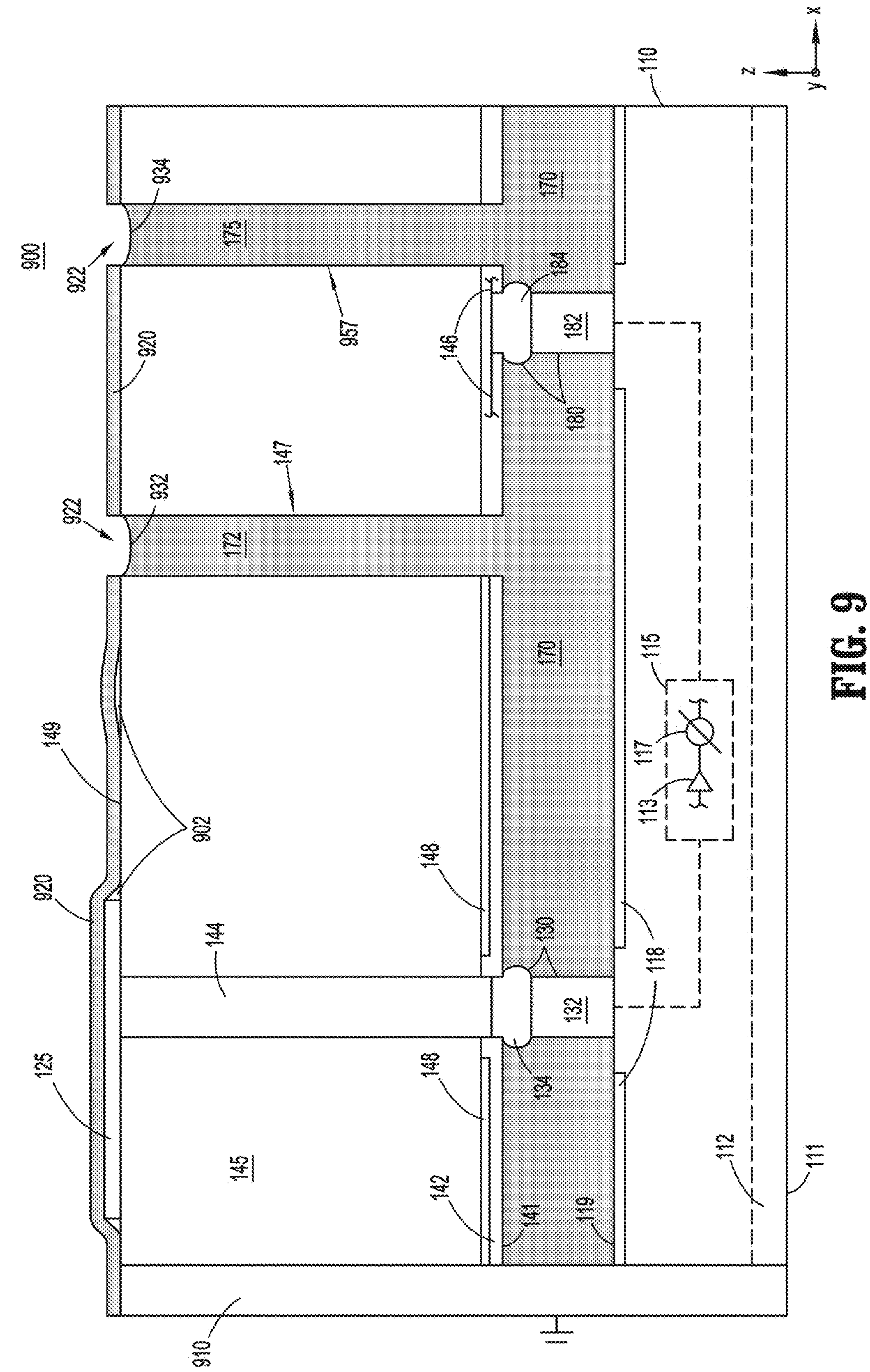
FIG. 9 is a cross-sectional view of an antenna including a polyimide protective layer according to an embodiment.

FIG. 9 is a cross-sectional view of an antenna 900 according to another embodiment. Antenna 900 employs a polyimide-based protective layer ("polyimide layer") 920, e.g., polyimide-based tape, over antenna element(s) 125 and upper surface 149 of antenna substrate 140. Polyimide layer 920 may be provided over an entire surface area of the antenna element(s) 125 and surface 149. As mentioned earlier, in certain environments such as on spacecrafts, undesirable floating metal may accumulate on an antenna surface over time. Polyimide layer 920 may prevent performance degradation due to such metal by including a small amount of germanium or equivalent metal, which bleeds off charges. To this end, a grounded member 910, e.g., a metal plate or rod, may be side mounted to antenna 900 and connect to polyimide layer 920 to bleed off such charges. However, the polyimide layer 920 may not conform perfectly to upper surface 149 and the outer surface of antenna element(s) 125, resulting in various air gaps 902 between polyimide layer 920 and surface 149/antenna element(s) 125. In a vacuum environment, the pressure within the air gaps 902 may cause the air gaps to worsen over time and eventually lead to separation of polyimide layer 920 from the antenna.

To reduce the likelihood of air gaps 902 expanding over time and causing the polyimide layer 920 to peel off, one or more openings 922 in polyimide layer 920 may be pre-cut, which allows air from nearby air gaps 902 to escape and thereby prevent their expansion. As illustrated in FIG. 9, an opening 922 may be vertically aligned with an underfill insertion opening 147 or an opening 957 in antenna substrate 140. Opening 957 may be a filled vacuum pull opening 157 or just an opening filled with material 175, e.g., absorber material serving to suppress substrate modes. Upper ends 932 and 934 of filled openings 147 and 957 may not be perfectly flush with adjacent areas of surface 149. As a result, if no openings 922 were cut in polyimide layer 920, additional air bubbles could exist between upper ends 932, 934 and the polyimide layer 920, leading to potential reliability issues.

In other embodiments, openings 922 are additionally or alternatively provided in regions of polyimide layer 920 that are not aligned with openings 147, 957 within antenna substrate 140. In still other embodiments, the technique of FIG. 9 in which one or more openings are 922 are formed in polyimide layer 920 to relieve air bubble pressure, is applied to antennas without any underfill insertion opening 147 or any further opening 957. In this case, underfill 170 may be inserted between antenna substrate 140 and RFIC 110 using a peripheral insertion method, or underfill 170 is omitted.

Figure 10:
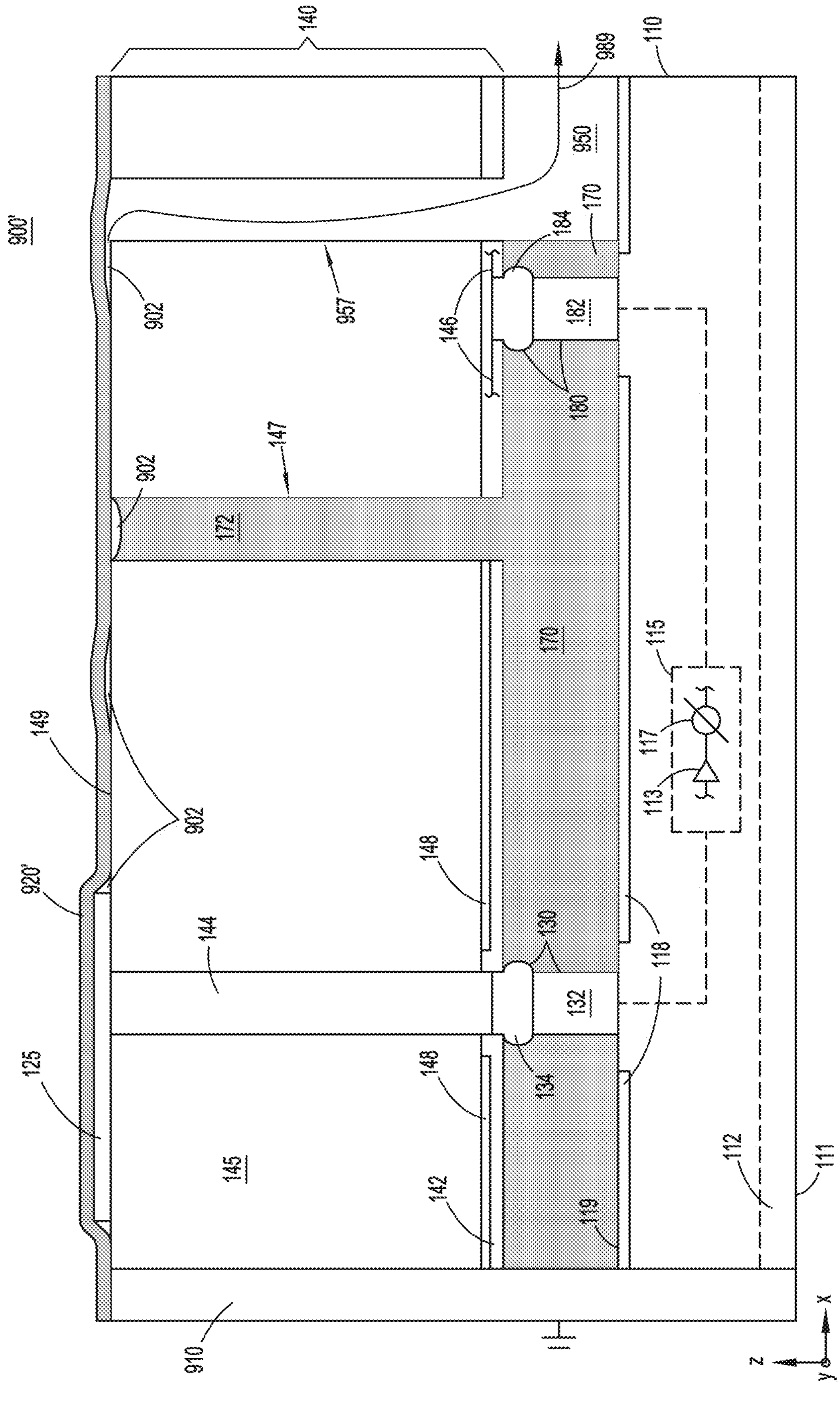
FIG. 10 is a cross-sectional view of an antenna including a polyimide protective layer and an air escape passage according to an embodiment.

FIG. 10 is a cross-sectional view of an antenna 900' according to another embodiment. Antenna 900' differs from antenna 900 of FIG. 9 by providing one or more "air escape openings" 957 unfilled with material, and providing an air escape region 950 directly beneath each opening 957. Thus, air within at least some of air gaps 902 may escape through opening 957 and region 950 in direction 989 as illustrated and thereby relieve pressure within air gaps 902. Polyimide layer 920' differs from polyimide layer 920 by covering omitting the opening 922 directly over opening 957. However, other openings 922 (not shown) may be provide in polyimide layer 920' in regions away from opening 957 to relieve pressure from air gaps 902 in those other regions.

The polyimide layers 920 or 920' (and associated air escape opening 957 and air escape region 950 in the latter example) may be arranged over the antenna element(s) 125 and upper surface 149 of any of the antennas 100, 400 or 700 described above. It is further noted here the technique of FIG. 10 is applicable to embodiments of antennas without an underfill insertion opening 147 (e.g., underfill is injected peripherally), or without underfill altogether. In other words, in these embodiments, an antenna similar to those described above, but without an underfill insertion opening 147 or any underfill 170, includes one or more air escape openings 957 and one or more corresponding escape regions 950 to relieve pressure from air bubbles between a polyimide protective layer 920' and an upper surface 149 of the antenna substrate 140.

While the technology described herein has been particularly shown and described with reference to example embodiments thereof, it will be understood by those of ordinary skill in the art that various changes in form and details may be made therein without departing from the scope of the claimed subject matter as defined by the following claims.

What is claimed is:

1. A method of forming an antenna, comprising:

forming an antenna element on an upper surface of an antenna substrate;

forming a first opening extending from the upper surface to a lower surface of the antenna substrate;

attaching a radio frequency integrated circuit (RFIC) component to the lower surface of the antenna substrate through a plurality of interconnects, the RFIC component thereby being spaced from the lower surface of the antenna substrate, and the RFIC component including beamforming circuitry for RF coupling to the antenna element through the antenna substrate;

inserting underfill into the first opening from the upper surface such that the underfill flows within a space between the interconnects;

forming a second opening in the antenna substrate between the upper and lower surfaces; and applying a vacuum to the second opening while the underfill is inserted into the first opening, wherein the RFIC component includes a first surface attached to the interconnects, a ground plane proximate the first surface, and a second, opposite surface forming part of an active die side.

2. The method of claim 1, wherein:

said forming an antenna element, attaching an RFIC component, forming a first opening, and inserting underfill are performed for each of a plurality of further antenna elements and a plurality of RFIC components including the RFIC component, the antenna thereby being formed as an active antenna array; and said inserting underfill results in each of the interconnects associated with at least one of the plurality of RFIC components being surrounded by underfill.

3. The method of claim 2, further comprising:

attaching a combiner/divider to the lower surface of the antenna substrate, with portions arranged between the plurality of RFIC components; and electrically connecting the plurality of RFIC components to the combiner/divider.

4. The method of claim 1, wherein said attaching an RFIC component to the lower surface of the antenna substrate comprises directly attaching the RFIC component to the lower surface of the antenna substrate.

5. The method of claim 1, further comprising:

forming a via within the antenna substrate, the via having a first end and an opposite, second end;

connecting the first end of the via to the antenna element; and connecting the second end of the via to one of the interconnects.

6. The method of claim 1, wherein the RFIC component is an indium phosphide (InP), gallium arsenide (GaAs) or gallium nitride (GaN) chip.

7. The method of claim 1, further comprising applying heat to cure the underfill subsequent to its insertion into the first opening.

8. The method of claim 1, wherein said inserting underfill into the first opening at least partially fills the first opening with the underfill after curing of the underfill.

9. The method of claim 1, further comprising forming the antenna substrate with a layered region proximate the lower surface, the layered region including an antenna ground plane and one or more conductive layers for providing control signals and/or bias signals to the beamforming circuitry.

10. The method of claim 1, further comprising:

filling the second opening with microwave or millimeter wave absorber material.

11. The method of claim 1, further comprising attaching metallization on the second surface to a combiner/divider through a wirebond.

12. A method of forming an antenna, comprising:

forming an antenna element on an upper surface of an antenna substrate;

forming a first opening extending from the upper surface to a lower surface of the antenna substrate;

attaching a radio frequency integrated circuit (RFIC) component to the lower surface of the antenna substrate through a plurality of interconnects, the RFIC component thereby being spaced from the lower surface of the antenna substrate, and the RFIC component including beamforming circuitry for RF coupling to the antenna element through the antenna substrate;

inserting underfill into the first opening from the upper surface such that the underfill flows within a space between the interconnects;

forming a second opening in the antenna substrate between the upper and lower surfaces;

applying a vacuum to the second opening while the underfill is inserted into the first opening; and at least partially filling the second opening with microwave or millimeter wave absorber material different from the underfill, subsequent to the insertion of the underfill within the first opening.

* * * * *